US011816882B2

(12) United States Patent
Irie et al.

(10) Patent No.: US 11,816,882 B2
(45) Date of Patent: Nov. 14, 2023

(54) IMAGE RECOGNITION LEARNING DEVICE, IMAGE RECOGNITION DEVICE, METHOD AND PROGRAM

(71) Applicant: NIPPON TELEGRAPH AND TELEPHONE CORPORATION, Tokyo (JP)

(72) Inventors: Go Irie, Tokyo (JP); Yu Mizutsumi, Hiroshima (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 253 days.

(21) Appl. No.: 17/262,121

(22) PCT Filed: Jul. 17, 2019

(86) PCT No.: PCT/JP2019/028097
§ 371 (c)(1),
(2) Date: Jan. 21, 2021

(87) PCT Pub. No.: WO2020/022144
PCT Pub. Date: Jan. 30, 2020

(65) Prior Publication Data
US 2021/0295112 A1    Sep. 23, 2021

(30) Foreign Application Priority Data
Jul. 23, 2018  (JP) .................. 2018-137735

(51) Int. Cl.
*G06V 10/82*  (2022.01)
*G06N 3/08*  (2023.01)
(Continued)

(52) U.S. Cl.
CPC .............. *G06V 10/82* (2022.01); *G06F 18/10* (2023.01); *G06F 18/22* (2023.01);
(Continued)

(58) Field of Classification Search
CPC ........ G06V 10/82; G06V 10/84; G06F 18/10; G06F 18/22; G06N 3/08; G06N 3/084; G06N 3/088; G06N 3/045; G06N 3/047
(Continued)

(56) References Cited

U.S. PATENT DOCUMENTS

2016/0358043 A1*  12/2016  Mu ................. G06F 16/5838
2019/0147642 A1*  5/2019  Cole ................. G06V 10/454
                                                         345/419
(Continued)

FOREIGN PATENT DOCUMENTS

CN       107578017 A  *  1/2018  ......... G06K 9/00248
CN       108171762 A  *  6/2018  ........... G06N 3/0454
(Continued)

OTHER PUBLICATIONS

Krizhevsky et al. (2012) "ImageNet Classification with Deep Convolutional Neural Networks" NIPS'12: Proceedings of the 25th International Conference on Neural Information Processing Systems—vol. 1, pp. 1097-1105.
(Continued)

*Primary Examiner* — Leon Viet Q Nguyen

(57) ABSTRACT

An image identification device can be trained to identify classes with high accuracy even in cases with a small number of learning images. Using a first loss function for outputting a value that is smaller the greater a similarity is between the belongingness probability of each class for the image output by the image identification device and a given teacher belongingness probability of the image, and a second loss function for, in a case in which the image input into the image identification device is an actual image, outputting a value that is smaller the smaller the estimated authenticity probability, which expresses how artificial the input image is, output by the image identification device is and for, in a case in which the image input into the image identification
(Continued)

device is an artificial image, outputting a value that is smaller the greater the estimated authenticity probability output by the image identification device is, iterative learning of a parameter of the image identification device is executed to reduce the value of the first loss function and the value of the second loss function.

20 Claims, 3 Drawing Sheets

(51) Int. Cl.
*G06F 18/2415* (2023.01)
*G06F 18/10* (2023.01)
*G06F 18/22* (2023.01)
*G06V 10/764* (2022.01)

(52) U.S. Cl.
CPC ............ *G06F 18/2415* (2023.01); *G06N 3/08* (2013.01); *G06V 10/764* (2022.01)

(58) Field of Classification Search
USPC .......................................... 382/181, 155–159
See application file for complete search history.

(56) References Cited

U.S. PATENT DOCUMENTS

| 2019/0362191 A1* | 11/2019 | Lin | ........................ | G06F 16/532 |
| 2021/0052233 A1* | 2/2021 | Kaplan | .................. | G06N 3/045 |

FOREIGN PATENT DOCUMENTS

| CN | 108960086 B | * | 6/2021 | ......... G06K 9/00362 |
| JP | 201832340 A | | 3/2018 | |

OTHER PUBLICATIONS

Salimans et al. (2016) "Improved Techniques for Training GANs" Advances in Neural Information Processing Systems 29, pp. 2226-2234.

Shrivastava et al. (2017) "Learning from Simulated and Unsupervised Images through Adversarial Training" Conference on Computer Vision & Pattern Recognition (CVPR), pp. 2242-2251.

* cited by examiner

IMAGE RECOGNITION LEARNING DEVICE, IMAGE RECOGNITION DEVICE, METHOD AND PROGRAM

CROSS-REFERENCE TO RELATED APPLICATIONS

This application is a U.S. 371 Application of International Patent Application No. PCT/JP2019/028097, filed on 17 Jul. 2019, which application claims priority to and the benefit of JP Application No. 2018-137735, filed on 23 Jul. 2018, the disclosures of which are hereby incorporated herein by reference in their entireties.

TECHNICAL FIELD

The present invention relates to an image recognition learning device, an image recognition device, a method, and a program and particularly relates to an image recognition learning device, an image recognition device, a method, and a program for identifying a class of image.

BACKGROUND ART

Image recognition is tasked with outputting a class relating to the content of an input image. There are various classes, representative examples including places and objects often found in images, name of scenes, and the like. For example, when an image showing a dog is input, image recognition technology is expected to output the class label "dog".

The debate on the performance of image recognition technology revolves around how accurately a correct class label for the input image can be output, and higher performance is linked to being able to more accurately output labels.

Images are constituted by a tensor with RGB pixels as elements. However, because there is a large divide between such low level (physical signal level) information and high level concepts such as class label, it has been considered difficult to execute recognition of a high accuracy by simply inputting images, in other words, it has been considered difficult to train a recognition device to output accurate labels. However, in the year 2011, Convolutional Neural Network (CNN) was used as a recognition device to demonstrate that highly accurate recognition achieved by learning from an array of pixels and directly outputting class labels is possible (NPL 1). Since then, there have continually been reports of dramatic enhancements to the accuracy of image recognition achieved by CNN.

The recognition accuracy of image recognition via CNN is known to be dependent on various factors. One such factor that greatly affects accuracy is the CNN architecture. Typically, a CNN is formed by stacks of various operators (also referred to as layers) that execute various types of relatively simple processing. Representative examples of such layers include a convolutional layer, a pooling layer, and a fully connected layer. A convolutional layer is, as the name suggests, a layer that applies a convolution filter to an input tensor, the convolution filter having a set height×width direction size. Further details can be found in NPL 1 and the like. The number of types of filters is discretionary and is typically decided on by the designer. The convolutional layer includes convolution filter weights as parameters. The weights are learned on the basis of data. Also a pooling layer is known as a layer without parameters typically needing to be learned. The pooling layer is similar to the convolutional layer in that both apply a filter to an input tensor, the filter having a set height×width direction size. The pooling layer is different in that a fixed and simple operation is applied to the area with the size described above, examples of the operation including outputting maximum values (maximum pooling) and outputting an average value (average pooling). This is used particularly to reduce the size of the input tensor without increasing the number of parameters. The performance of CNN is affected by how the convolutional layers and the pooling layers are configured and how they are arranged.

In typical image recognition, the recognition device is required to be trained in advance to recognize a desired class by training the recognition device with a set of images (hereinafter, referred to as learning images) designed to help correct recognition. Thus, it is safe to say that, obviously, the recognition accuracy is dependent on the quality and the number of the learning images. Generally, it is known that, when it comes to the complexity of a recognition device, the greater the complexity of the recognition device, the greater the number of learning images are needed. However, CNNs have a particularly high expression capability and are complex models. Thus, it can be said that good performance is only realized when the recognition device is trained with an extremely large number of learning images. In other words, the success of current CNNs can be considered to have come from the combination of good quality CNN configurations and a large number of learning images.

However, obtaining a large number of learning images is not simple. This is because, in many cases, for a newly taken image, class labels that indicate what the object in the image is are not applied, and to make images into learning images, a person must look at the contents of the image and perform "labeling" to tag the image with what the object is. The ILSVRC data (see NPL 1) is the most well-known dataset of learning images in the field of image recognition by CNN and the dataset actually includes more than 1.2 million learning images. If, for example, it took 5 seconds to label one image, with no breaks included, the time needed to label all of these images would be more than 2 months. Of course, classes determined by a single person are not 100% reliable. Thus, typically, a consensus among a plurality of persons is used, meaning that the actual man-hours involved are several times greater. Also, with such a scale, even taking and collecting the images to be labeled is not a simple task. The cost of creating the learning images, when also considering the costs involved in purchasing and using CNN image recognition technology, is a formidable barrier.

To solve this problem, various inventions have been proposed.

For example, NPL 2 discloses a learning method for a recognition device using image generation. A CNN configured as a recognition device and a CNN generation device for generating images are both prepared. The recognition device has the typical function of outputting a class label as well as being required to learn how to distinguish between true or fake images (actual images or fake images generated by the generation device). The generator on the other hand is required to learn to generate images easily mistaken as actual images, or in other words, to trick the recognition device into making an incorrect true/fake determination. With such a configuration, by generating "fake images" similar to true images and using these images as supplementary learning images, a recognition device can be trained even with a small number of labeled images.

In another example, NPL 3 discloses a learning method for a recognition device using image conversion. The method of realizing this is similar to the method described in NPL 2 in that "fake images" similar to true images are generated. The difference in the methods lies in that, while in NPL 2, the generation device is used to generate images, in the present technology, a conversion device is prepared that converts CG images generated by computer graphics (CG) to images that can be mistaken from actual images.

In yet another example, the technology disclosed in PTL 1 is a method of estimating various features relating to an object in an image and estimating a class label from a feature. This allows meaningful recognition results to be output from a small number of learning images.

CITATION LIST

Patent Literature

[PTL 1] Japanese Patent Application Publication No. 2018-032340

Non Patent Literature

[NPL 1] Alex Krizhevsky, Ilya Sutskever, Geoffrey E. Hinton, "ImageNet Classification with Deep Convolutional Neural Networks." In Proc. Advances in Neural Information Processing Systems (NIPS), Pages. 1097-1105, 2012.
[NPL 2] Tim Salimans, Ian Goodfellow, Wojciech Zaremba, Vicki Cheung, Alec Radford, and Xi Chen, "Improved Techniques for Training GANs." In Proc. Advances in Neural Information Processing Systems 29 (NIPS), Pages. 2226-2234, 2016.
[NPL 3] Ashish Shrivastava, Tomas Pfister, Oncel Tuzel, Josh Susskind, Wenda Wang, and Russ Webb, "Learning from Simulated and Unsupervised Images through Adversarial Training." In Proc. Conference on Computer Vision & Pattern Recognition (CVPR), Pages. 2242-2251, 2017.

SUMMARY OF THE INVENTION

Technical Problem

The technology of NPL 2 and NPL 3 are the results of a logical conclusion to make up for the lack of learning images by providing artificial images via generation or conversion. However, in each of these technologies, artificial images are generated or converted on the principle that artificial images should be generated or converted to be similar to actual images. However, in light of the real objective, that of enhancing image recognition accuracy, generated or converted artificial images have merit of their own in learning, not just in their use in being similar to actual images.

Also, in the technology disclosed in PTL 1, labels are expressed via features, which are intermediary and meaningful expressions. This allows the number of learning images to be reduced. However, the method of configuring features is unclear, and the method of selecting the features most relevant to image recognition accuracy is also unclear.

From the overview given above, we can see that none of the known technologies provide a method optimized for image recognition accuracy.

The present invention was made in light of the foregoing and has an objective of providing an image recognition learning device, a method, and a program that can train an image identification device to identify a class with high accuracy even in cases with a small number of learning images.

Another objective is to provide an image recognition device, a method, and a program that can identify a class with high accuracy using a trained image identification device even in cases with a small number of learning images.

Means for Solving the Problem

To achieve the object described above, an image recognition learning device according a first invention that includes an image identification device that outputs a belongingness probability of each class for an input image and an estimated authenticity probability expressing how artificial the input image is, includes a learning unit that, for the image identification device, executes iterative learning of a parameter of the image identification device, using a first loss function for outputting a value that is smaller the greater a similarity is between the belongingness probability of each class for the image output by the image identification device and a given teacher belongingness probability of the image, and a second loss function for, in a case in which the image input into the image identification device is an actual image, outputting a value that is smaller the smaller the estimated authenticity probability output by the image identification device is and for, in a case in which the image input into the image identification device is an artificial image, outputting a value that is smaller the greater the estimated authenticity probability output by the image identification device is, the learning unit executing the iterative learning to reduce the value of the first loss function and the value of the second loss function.

In the image recognition learning device according to the first invention, the teacher belongingness probability may be a desired belongingness probability of each class or may be a belongingness probability of each class output for the image by the image identification device in a learning in progress stage of the iterative learning with different numbers of iterations.

In the image recognition learning device according to the first invention, the artificial image may be generated by an image generation device that outputs an artificial image using at least one or more random numbers; and the learning unit, for the image generation device, may execute iterative learning of a parameter of the image generation device to increase the value of the first loss function and the value of the second loss function.

An image recognition device according to a second invention determines a belongingness probability of each class for an input image and outputs a class recognition result using the image identification device with a parameter learned by the image recognition learning device according to the first invention.

An image recognition learning method according to a third invention is a method for an image recognition learning device including an image identification device that outputs a belongingness probability of each class for an input image and an estimated authenticity probability expressing how artificial the input image is, the method including: a learning unit executing, for the identification device, iterative learning of a parameter of the image identification device, using a first loss function for outputting a value that is smaller the greater a similarity is between the belongingness probability of each class for the image output by the image identification device and a given teacher belongingness probability of the image, and a second loss function for, in a case in which the image input into the image identification device is an actual image, outputting a value that is smaller the smaller the estimated authenticity probability output by the image identification device is and for, in a case in which the image input into the image identification device is an artificial image, outputting a value that is smaller the greater the estimated authenticity probability output by the image identification device is the learning unit executing the iterative learning to reduce the value of the first loss function and the value of the second loss function.

The image recognition method according to a fourth invention determines a belongingness probability of each class for an input image and outputs a class recognition result using the image identification device with a parameter learned by the image recognition learning device according to the first invention.

A program according to a fifth invention is a program for causing a computer to function as the image recognition learning device according to the first invention or the image recognition device according to the second invention.

Effects of the Invention

According to the image recognition learning device, method, and program of the present invention, the image identification device uses a first loss function for outputting a value that is smaller the greater a similarity is between the belongingness probability of each class for the image output by the image identification device and a given teacher belongingness probability of the image, and a second loss function for, in a case in which the image input into the image identification device is an actual image, outputting a value that is smaller the smaller the estimated authenticity probability, which expresses how artificial the input image is, output by the image identification device is and for, in a case in which the image input into the image identification device is an artificial image, outputting a value that is smaller the greater the estimated authenticity probability output by the image identification device is to execute iterative learning of a parameter of the image identification device to reduce the value of the first loss function and the value of the second loss function. In this way, an effect can be obtained that the identification device can be trained to identify classes with high accuracy even in cases with a small number of learning images.

Also, according to the image recognition device, method, and program of the present invention, an effect can be obtained that classes can be identified with high accuracy using the trained image identification device.

DESCRIPTION OF EMBODIMENTS

Embodiments of the present invention will be described in detail below with reference to the drawings.

<Configuration of Image Recognition Learning Device According to an Embodiment of the Present Invention>

Figure 1:
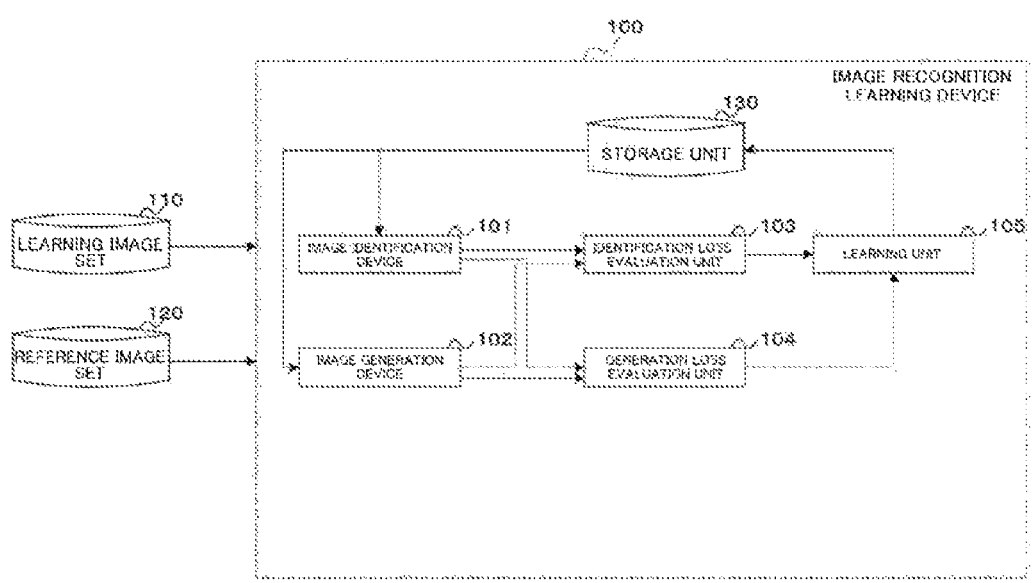
FIG. 1 is a block diagram illustrating the configuration of an image recognition learning device according to an embodiment of the present invention.

Next, the configuration of an image recognition learning device according to an embodiment of the present invention will be described. FIG. 1 is a function block diagram illustrating an example of the configuration of an image recognition learning device 100 according to an embodiment of the present invention. As illustrated in FIG. 1, the image recognition learning device 100 according to an embodiment of the present invention may be constituted by a computer including a CPU, a RAM, and a ROM in which is stored a program and/or various data for executing an image recognition learning processing routine described below. As illustrated in FIG. 1, the image recognition learning device 100 is a device with a function designed to receive an input of a learning image set 110 and a reference image set 120 from outside and store learned parameters of an image identification device 101 in a storage unit 130.

The learning image set 110 is a set of actual images tagged with desired class labels. The reference image set 120 is a set of actual images not tagged with desired class labels. The two are different in terms of whether or not they are tagged with class labels, and a portion of all of the images in the learning image set 110 may be included in the reference image set 120.

The image identification device 101 uses a function having parameters that can receive an input of an image and output a belongingness probability (hereinafter, estimated belongingness probability) for the input image for each class and a probability (hereinafter, estimated authenticity probability) that expresses how artificial the input image is. Any discretionary function that is differentiable with respect to the parameter can be used. In the present invention, a CNN is preferably used. Thus, an embodiment in which a CNN is used will be described below. Note that an image generation device 102 described below also uses a CNN.

Note that the learning image set 110, the reference image set 120, and the storage unit 130 may be provided inside the image recognition learning device 100 or outside thereof. This is not essential to achieving the effects of the present invention. In the present embodiment described below, the configuration illustrated in FIG. 1 is used. In other words, the learning image set 110 and the reference image set 120 are provided outside of the image recognition learning device 100 and are connected and perform input via communications. A discretionary known communication means can be used. In the present embodiment, connection via the Internet or TCP/IP communication is used. Also, the storage unit 130 is provided inside the image recognition learning device 100 and is connected via a bus.

The components of the image recognition learning device 100 may be constituted by a computer, server, and the like provided with a computational processing device, a storage device, and the like. The processing of each component may be executed by a program. The program is stored in the storage device of the image recognition learning device 100 and can be stored on a recording medium, such as a magnetic disk, an optical disc, and a semiconductor memory or can be provided via a network. Naturally, other constituent elements need not be realized using a single computer or server and may be realized using a plurality of distributed computers connected via a network.

Description of Processing Unit

The processing units of the image recognition learning device 100 according to the present embodiment will be described below. Note that the processing executed by the processing units will be described in detail below in the section "Processing details of each processing".

[Operation of Processing Unit]

The image identification device 101 outputs an estimated belongingness probability for the input image and an estimated authenticity probability for the input image. The estimated belongingness probability is a probability expressing the likelihood that an image belongs to each class. The estimated authenticity probability is a probability expressing how artificial the image is. Each time the image identification device 101 executes identification, the image identification device 101 loads the parameters from the storage unit 130 and executes identification.

The image generation device 102 uses one or more random numbers generated by an internal random number generator to generate an artificial image and outputs the artificial image. Each time the image generation device 102 generates an artificial image, the image generation device 102 loads the parameters from the storage unit 130 and executes generation.

An identification loss evaluation unit 103 receives input of an image (an actual image, an artificial image, any in the form of an image), a flag indicating whether the image is an actual image or an artificial image, the estimated belongingness probability output by the image identification device 101 for the image, and a desired belongingness probability (hereinafter, teacher belongingness probability) for the image and determines a value of an identification loss function, which is a first loss function expressing the difference between these. The teacher belongingness probability is the belongingness probability for the correct class label when learning is executed. The identification loss function may further include a loss function expressing the difference between an estimated belongingness probability output, after a number of passes of iterative learning, by the image identification device 101 for an artificial image output by the image generation device 102 and an estimated belongingness probability output by the image identification device 101 for the artificial image output by the image generation device 102. Note that the teacher belongingness probability is defined as a belongingness probability $t^*$ relating to a learning in progress stage described below in the case in which the image is an artificial image.

A generation loss evaluation unit 104 receives input of an image, a flag indicating whether the image is an actual image or an artificial image, and the estimated authenticity probability output by the image identification device 101 for the image and determines a value of a generation loss function, which is a second loss function expressing the difference between these.

A learning unit 105 uses the value of the identification loss function and the value of the generation loss function determined by the identification loss evaluation unit 103 and the generation loss evaluation unit 104 and executes iterative learning of the parameters of the image identification device 101 to decrease the value of the identification loss function and the value of the generation loss function. After each learning pass, the parameters of the image identification device 101 are stored in the storage unit 130. Also, the learning unit 105 executes iterative learning of the parameters of the image generation device 102 to increase the value of the identification loss function and the value of the generation loss function, and after each learning pass, the parameters of the image identification device 101 are stored in the storage unit 130.

<Configuration of Image Recognition Device According to an Embodiment of the Present Invention>

Figure 2:
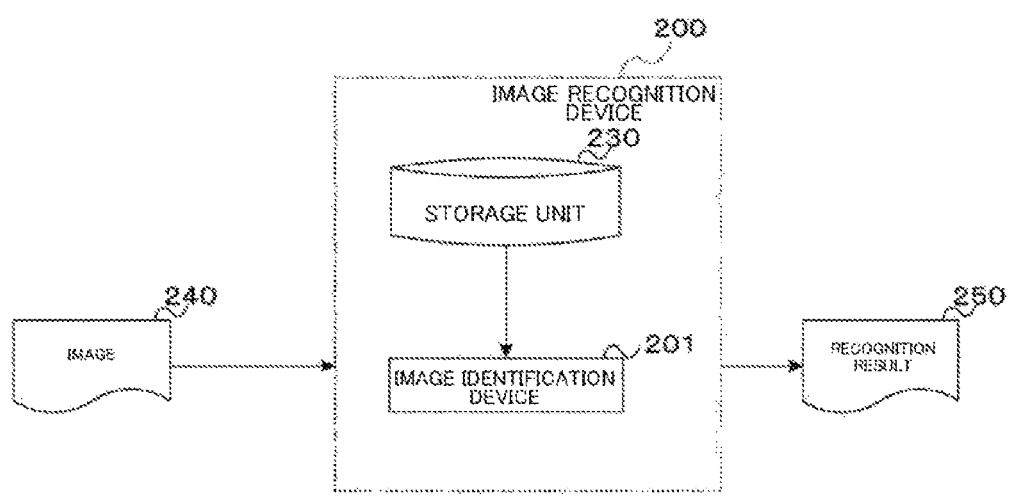
FIG. 2 is a block diagram illustrating the configuration of an image recognition device according to an embodiment of the present invention.

Next, the configuration of an image recognition device according to an embodiment of the present invention will be described. Initially, the image identification device 101 is trained with the image recognition device 200, and the learned parameters are stored in the storage unit 130. Then, when actually used, as illustrated in FIG. 2, the image recognition device 200 can execute image recognition processing using only an image identification device 201 and a storage unit 230 in which the learned parameters of the image identification device 201 are stored.

The image recognition device 200 receives input of an image 240, applies the image identification device 201, reads out a parameter θ from the storage unit 230, determines an estimated belongingness probability for the input image 240, and outputs a class recognition result 250. Note that the effects of the image recognition device 200 can be achieved by steps of executing processing similar to that described above.

<Effects of Image Recognition Learning Device according to an Embodiment of the Present Invention>

Figure 3:
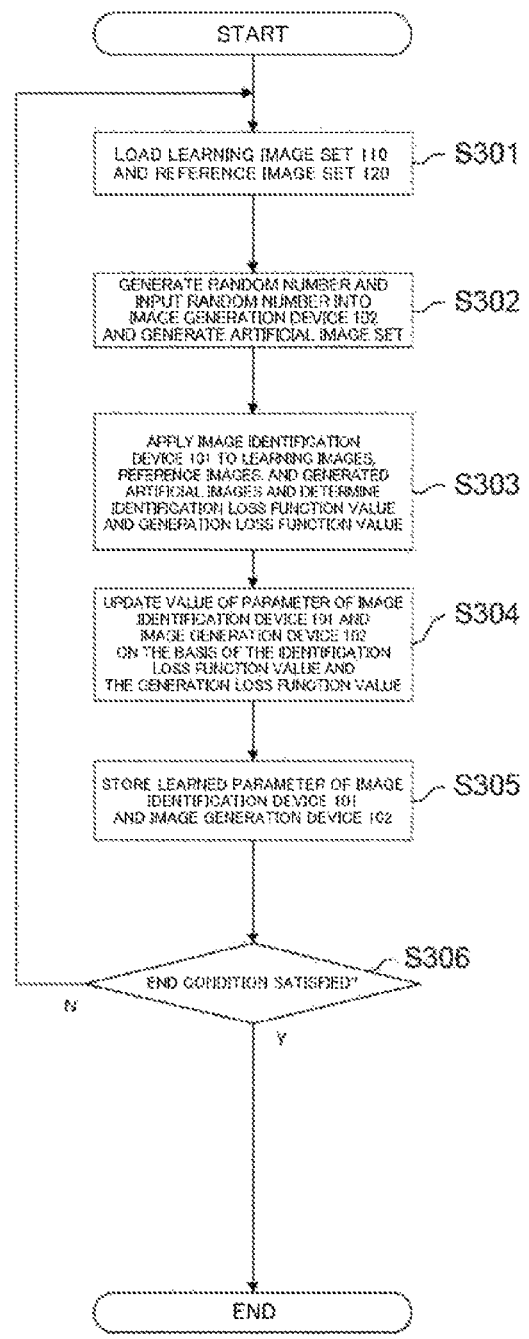
FIG. 3 is a flowchart illustrating an image recognition learning processing routine of an image recognition learning device according to an embodiment of the present invention.

Next, the effects of the image recognition learning device 100 according to an embodiment of the present invention will be described. The image recognition learning device 100 receives the learning image set 110 and the reference image set 120 and executes an image recognition learning processing routine illustrated in FIG. 3.

Initially, in step S301, one or more learning image sets 110 and reference image sets 120 are loaded.

Next, in step S302, the parameters of the image generation device 102 stored in the storage unit 130 are loaded, one or more random numbers are generated and input into the image generation device 102, and an artificial image set including one or more artificial images is created.

In step S303, the parameters of the image identification device 101 stored in the storage unit 130 are loaded, the image identification device 101 is applied to the learning images of the learning image set 110, the reference images of the reference image set 120, and the generated artificial image/s, and an identification loss function and generation loss function are determined.

In step S304, the value of the parameters of the image identification device 101 and the image generation device 102 are updated on the basis of the identification loss function value and the generation loss function value determined in step S303.

In step S305, the parameters of the image identification device 101 and the image generation device 102 updated in step S304 are stored in the storage unit 130.

In step S306, whether or not an end condition has been met is determined. If the end condition has been met, the process ends. If the end condition has not been met, the process returns to step S301.

By iterative learning via repeating steps S304 to S306 described above, the image identification device 101 can use the identification loss function and the generation loss function described next to learn parameters of the image identification device 101 to reduce the values of the identification loss function and the generation loss function. Here, the output value of the identification loss function is smaller the greater the similarity is between the estimated belongingness probability of the image output by the image identification device 101 and the given teacher belongingness probability of the image. The output value of the generation loss function is, in the case in which the image input into the image identification device 101 is an actual image, smaller the smaller the estimated authenticity probability output by the image identification device 101 is and, in the case in which the image input into the image identification device 101 is an artificial image, smaller the greater the estimated authenticity probability output by the image identification device 101 is. Also, the image generation device 102 learns parameters of the image generation device 102 to increase the value of the identification loss function and the value of the generation loss function.

[Processing Details of Each Processing]

Next, the processing of the processing units of the image recognition learning device 100 will be described in detail below.

[Image Generation Processing]

The image generation processing executed by the image generation device 102 in step S302 will be described. The image generation device 102 is realized by receiving input of one or more random numbers (in other words, a random vector) z and outputting an artificial image v using the function of Formula (1) below having a parameter φ.

[Formula 1]

$$v = G(z; \phi) \quad (1)$$

Various means for realizing the function G may be used. However, in this example of an embodiment of the present invention, a CNN is used. To give a more specific example, a CNN called the Generator Network described in NPL 4 may be used, for example.

[NPL 4] Tim Salimans, Ian J. Goodfellow, Wojciech Zaremba, Vicki Cheung, Alec Radford, Xi Chen, "Improved Techniques for Training GANs", In Proc. Advances in Neural Information Processing Systems (NIPS), Pages. 2226-2234, 2016.

This G configured by the CNN has good properties in that it is differentiable with respect to φ.

[Evaluation of Identification Loss Function]

The evaluation processing of the identification loss function value of the identification loss evaluation unit 103 executed in step S303 will be described.

The output value of the identification loss function is smaller the greater the similarity is between the estimated belongingness probability of the image output by the image identification device 101 and the given teacher belongingness probability of the image. The identification loss function corresponds to Formula (4) and Formula (5) below. Here, value corresponds to the value of the identification loss function.

The image identification device 101 can be expressed as a function having the parameter θ that outputs an estimated belongingness probability y in response to an input of an image x. This function can be expressed as a typical probability function such as Formula (2) below.

[Formula 2]

$$P(y|x; \theta) \quad (2)$$

Formula (2) is the probability of occurrence of y with a given θ and x. A preferable image identification device 101 finds the teacher belongingness probability t with a given learning image s for each class. In other words, a preferable image identification device 101 can determine the belongingness probability at which the correct class can be identified. It is sufficient that learning can set the parameter θ so that the value of Formula (3) decreases, where s is the learning image and p(s, t) is the probability of occurrence of the corresponding teacher belongingness probability t.

[Formula 3]

$$\mathbb{E}_{p(s,t)}[-\log p(t|s;\theta)] \quad (3)$$

$E_b[a]$ is the expected value for probability b with respect to a. In the present embodiment of the present invention, the learning images are acquired from the learning image set. Thus, the expected value may be approximately substituted with the form of a summation as in Formula (4) below.

[Formula 4]

$$L_1(\theta) = - \sum_{s,t \in (S,T)} \log p(t|s; \theta) \quad (4)$$

Note that S and T are a set of one of more images and the corresponding teacher belongingness probability. Formula (4) is an identification loss function of an example of an embodiment of the present invention, and a value after evaluating with a discretionary S and T is the identification loss function.

A preferable image identification device 101 can be obtained that is capable of outputting t with respect to s by decreasing θ in Formula (4). Various methods for determining this θ exist. In the case in which the probability function p expressing the image identification device 101 is differentiable with respect to θ, a known local minimization method can be used. Thus, in an example of an embodiment of the present invention, as the image identification device 101, a function capable of outputting an estimated belongingness probability y with an input image x and being differentiable with respect to θ is selected.

Any known function that satisfies these properties can be used. However, in an example of an embodiment of the present invention, a CNN is used, for example. In an example of an embodiment of the present invention, a CNN is used. A CNN is preferable due to it having high image identification performance.

The CNN may have a discretionary architecture. For example, the architecture described in NPL 1 may be used. The processing to determine θ may also use backpropagation as described in NPL 1. Backpropagation is a method that can be used in the case in which p is differentiable with respect to θ when learning is actually executed on the basis of Formula (4). By directly determining a value by differentiating Formula (4) with respect to θ, then subtracting a value, obtained by multiplying the value obtained by differentiation and a coefficient (typically, a small value less than or equal to 1), from θ, θ can be continually updated allowing a θ that can reduce the value of Formula (4) to be found.

Note that the identification loss function of Formula (4) can also be evaluated for an image that is not a learning image, in other words, a reference image u and the artificial image v. The artificial image v will now be described using an example. In this example, a parameter of the image identification device 101 in a learning in progress stage is θ* and a desired belongingness probability output when an artificial image v=G(z;φ) is input into the image identification device 101 is t*. t*~p(t|G(z;φ);θ*) is an estimated belongingness probability for the artificial image output by the image identification device 101 in a learning in progress stage or, in other words, with different numbers of iterations for iterative learning. If t* is taken as a teacher belongingness probability, which is a desired belongingness probability for the artificial image v, the corresponding identification loss function can be expressed by Formula (5) below.

[Formula 5]

$$L_2(\theta, \phi) = - \sum_{z \in Z} \log p(t^*|G(z; \phi); \theta) \quad (5)$$

Here, Z is a set of random vectors z generated for the generation of an artificial image. Obviously, Formula (5) is differentiable with respect to θ as is the case with Formula (4) and allows a θ that can reduce the value of Formula (5) to be found. In other words, the image identification device 101 can train parameters of the image identification device 101 that enable, using Formula (5), the output an estimated belongingness probability for the artificial image v=G(z;φ) at a certain point in time. In the present embodiment, the identification loss function includes the function of Formula (4) and the function of Formula (5).

Also important to note is that, if G of the image generation device 102 is differentiable with respect to φ, then Formula (5) is differentiable with respect to φ. The G configured as described in the example of a method of configuring described above is differentiable with respect to φ. This means that the G (in other words, φ) of the image generation device 102 is also trainable using Formula (5). This is mentioned here for use later.

[Evaluation of Generation Loss Function]

The evaluation processing of a value for the generation loss function of the generation loss evaluation unit 104 also executed in step S303 will be described.

The output value of the generation loss function is, in the case in which the image input into the image identification device 101 is an actual image, smaller the smaller the estimated authenticity probability output by the image identification device 101 is and, in the case in which the image input into the image identification device 101 is an artificial image, smaller the greater the estimated authenticity probability output by the image identification device 101 is. The generation loss function corresponds to Formula (6) below.

Obviously, the artificial image v is preferably likely to be mistaken for an actual image, in other words, for the learning image s or the reference image u. To realize this, in an example of an embodiment of the present invention, the image identification device 101 is made to output, instead of an estimated belongingness probability, an estimated authenticity probability for determining whether an image is an actual image or an artificial image.

To enable output of an estimated authenticity probability, the CNN constituting the image identification device 101 does not need to be provided with a special function. For example, a method such as that disclosed in NPL 4 may be used. In the case in which the number of classes to be identified by the image identification device 101 as K (the dimension of the belongingness probability is K), if one more class is added to make K+1, then the probability of the K+1 class is treated as fake probability, or in other words, the probability that the image is an artificial image.

In the case in which an artificial image is input into the image identification device 101, because the artificial image is not an actual image, which class from among the K number of classes it belongs to does not need to be determined. Thus, the probability value of none of the K number of classes, or in other words the K+1 class, should be estimated to be a higher value. On the other hand, in the case in which an actual image is input, the image should be determined to belong to one of the K number of classes, and so the probability value of the K+1 class should be estimated to be a lower value.

A loss function for satisfying the above can be laid out as in Formula (6) below.

[Formula 6]

$$L_3(\theta, \phi) = -\sum_{u \in U} \log(1 - p(y = K+1|u; \theta)) - \sum_{z \in Z} \log p(y = K+1|G(z, \phi); \theta) \quad (6)$$

U is a set of reference images. The first member is a member relating to the reference image, and, in the case in which the image input into the image identification device 101 is correctly determined to be an actual image, in other words, when p(y=K+1|u;θ) is a small value, the first member takes a small value. On the other hand, the second member is a member relating to the artificial image, and, in the case in which the image is correctly determined to be an artificial image, the second member is a small value.

Thus, by finding a θ that can reduce the value of Formula (6), the image identification device 101 can come to determine whether an input image is an actual image or an artificial image. Obviously, Formula (6) is differentiable with respect to θ, and this learning can be realized using backpropagation, for example, in a similar manner as described above.

The image generation device 102 trains the parameters of the image generation device 102 to generate an artificial image that can produce an incorrect determination by the image identification device 101, or in other words, an artificial image that can be mistaken for a reference image. In this way, the image generation device can generate preferable images. This learning can be realized by determining a φ that can increase the value of Formula (6). Formula (6) is differentiable with respect to φ, and thus by updating using the derivative to increase the value of Formula (6), or in other words, switching the typical positive/negative direction of backpropagation, this learning can be realized. In the present embodiment, the generation loss function includes Formula (6).

[Learning Processing]

Next, the learning processing of the learning unit 105 in step S304 will be described. The evaluation methods of the identification loss function and the generation loss function and how the image identification device 101 and the image generation device 102 can be trained using these loss functions has been described.

Here, the process of training the image identification device 101 and the image generation device 102 using these loss functions will be described in detail.

In an example of an embodiment of the present invention, the sum of the identification loss function and the generation loss function is used to train the image identification device 101 and the image generation device 102. Specifically, Formula (7) is solved.

[Formula 7]

$$\min_{\theta} \max_{\phi} L_1(\theta) + \alpha L_2(\theta, \phi) + L_3(\theta, \phi) \quad (7)$$

α is a given value greater than or equal to 0 and can be set as 0.3, for example. Similar to as described above, $L_1$, $L_2$, $L_3$ are all differentiable with respect to θ and φ. Thus, the sum as expressed by Formula (7) is also differentiable. The values of θ and φ are repeatedly updated and training is executed so that, for the image identification device 101, the value of parameter θ of Formula (7) becomes smaller and, for the image generation device 102, the parameter φ of Formula (7) becomes bigger.

The expected effects of this learning will now be described. Initially, $L_1$ is minimized with respect to θ. This produces the effect of enhancing recognition accuracy on the basis of the learning images in a similar manner to typical image recognition learning. Also, $L_3$ is minimized with respect to θ, and maximized with respect to φ. This produces the effect of enabling generation by the image generation device 102 of an artificial image that can be mistaken for an actual image.

Most important, however, is $L_2$. Maximizing $L_2$ with respect to φ requires the image generation device 102 to generate an artificial image that is difficult to be identified by the image identification device 101. In other words, the image generation device 102 trained via Formula (7) learns to generate images that are likely to be mistaken for an actual image and that are images that are difficult to be identified by the image identification device 101.

Also, minimizing $L_2$ with respect to θ requires the image identification device 101 to identify artificial images similar to actual images and difficult to identify as belonging to a class estimated to be correct. Such requirement is a desirable property from the perspective of enhancing recognition accuracy. Being able to recognize an artificial image that is obviously not an actual image has little practical effect. Also, generating images that, while similar to actual images, are easy to recognize does not produce the effect of enhancing image recognition accuracy. The learning processing based on Formula (7) of an example of an embodiment of the present invention requires the generation of artificial images taking in consideration of these two factors and the training of the image identification device 101 using the generation of artificial images. This allows learning to be realized that produces an effect of greatly enhancing image recognition accuracy. Learning such as that described above produces an effect that cannot be obtained only using technology that can generate artificial images likely to be mistaken for an actual image, such as that disclosed in NPL 4, for example. As described above, artificial images are generated from random numbers. As random numbers may be generated continuously, artificial images may also be generated continuously. Thus, in cases in which only a small number of learning images can be obtained, artificial images can be used to make up for this shortage, allowing learning processing to be executed.

The learning processing can be repeated until an end condition is satisfied.

A discretionary end condition can be used. Examples include "repeat for a predetermined number of times", "until a value of a target function stops changing by a certain value or greater", "until a value for accuracy reaches a certain value or greater", "when verification data prepared separate to learning data is used, a value for accuracy stops changing by a certain value or greater", "when verification data prepared separate to learning data is used, a value for accuracy reaches a certain value or greater", and the like.

Thus ends the description of an example of the processing operation.

As described above, according to an image recognition learning device, method, and program according to an embodiment of the present invention, the image identification device 101 uses the identification loss function and the generation loss function described next and executes iterative learning of a parameter of the image identification device 101 to reduce the value of the identification loss function and the value of the generation loss function. In this way, the parameter of the image identification device 101 can be trained to identify class with high accuracy even in cases with a small number of learning images. Here, the output value of the identification loss function is smaller the greater the similarity is between the estimated belongingness probability of the learning image output by the image identification device 101 and the given teacher belongingness probability of the learning image. The output value of the generation loss function is, in the case in which the image input into the image identification device 101 is an actual image, smaller the smaller the estimated authenticity probability output by the image identification device 101 is and, in the case in which the image input into the image identification device 101 is an artificial image, smaller the greater the estimated authenticity probability output by the image identification device 101 is.

Also, by employing a configuration in which the image identification device 101 is trained using actual images and artificial images, an image recognition learning device, image recognition method, and program can be provided with a high accuracy image identification device 101 that can be realized from a small number of teaching image data.

The identification loss function and the generation loss function are used in learning. The image generation device 102 is trained so that the values of the identification loss function and the generation loss function increase. As a result, the image generation device 102 can come to generate images that are likely to be mistaken as actual images by the image identification device 101 and that cause the image identification device 101 to tag incorrect class labels. The image identification device 101 is trained so that the values of the identification loss function and the generation loss function decrease. As a result, training can be executed to correctly classify actual images and to bring images from among artificial images that are taken as being similar to actual images to have a belongingness probability closer to a desired belongingness probability. Due to this interaction between the image identification device 101 and the image generation device 102, the image identification device 101 can be trained with images generated by the image generation device 102 that are similar to actual images and that the current iteration of the image identification device 101 finds more difficult to recognize. As a result, an image identification device 101 with very high accuracy can be realized from only a small number of teacher image data.

Note that the present invention is not limited to the embodiments described above, and various modifications and applications can be made without departing from the scope of the present invention.

For example, in an embodiment described above, the image recognition learning device and the image recognition device are configured to separate devices. However, no such limitation is intended, and they may be configured as the same device. In such a case, the learning processing should be executed at least one time before image recognition is executed using the image identification device.

REFERENCE SIGNS LIST

100 Image recognition learning device
101 Image identification device
102 Image generation device
103 Identification loss evaluation unit
104 Generation loss evaluation unit
105 Learning unit
110 Learning image set 120 Reference image set
130 Storage unit
200 Image recognition device
201 Image identification device
230 Storage unit
240 Image
250 Recognition result

The invention claimed is:

1. An image recognition learning device comprising a processor configured to execute operations comprising:
 iteratively learning a parameter associated with identifying an image by using:
  a first loss function outputting a smaller value as a similarity between a belongingness probability of each class for the image and a given teacher belongingness probability of the image becomes greater, and
  a second loss function configured to:
   when the image is an actual image, output a smaller value as an estimated authenticity probability becomes smaller and
   when the image an artificial image, output a smaller value as an estimated authenticity probability becomes greater, and
  wherein the iteratively learning further comprises reducing the value of the first loss function and the value of the second loss function.

2. The image recognition learning device according to claim 1, wherein the teacher belongingness probability includes either one of a desired belongingness probability of each class or the belongingness probability of each class output for the image in a learning in progress stage of the iteratively learning with different numbers of iterations.

3. The image recognition learning device according to claim 1, wherein the artificial image is generated using one or more random numbers, and wherein the iteratively learning further comprises increasing a first value of the first loss function and a second value of the second loss function.

4. The image recognition learning device according to claim 1, wherein the iteratively learning further comprises determining the belongingness probability of each class for the input image and outputting a class recognition result using the learnt parameter.

5. A computer implemented method for learning image recognition, comprising:
 iteratively learning a parameter associated with identifying an image by using:
  a first loss function outputting a smaller value as a similarity between a belongingness probability of each class for the image and a given teacher belongingness probability of the image becomes greater, and
  a second loss function:
   when the image is an actual image, outputting a smaller value as an estimated authenticity probability becomes smaller, and
   when, the image is an artificial image, outputting a value that is smaller as the estimated authenticity probability becomes greater, and
  wherein the iteratively learning further comprises reducing the value of the first loss function and the value of the second loss function.

6. The image recognition learning method according to claim 5, the method further comprising:
 determining the belongingness probability of each class for an input image; and
 outputting a class recognition result using the learnt parameter.

7. A computer-readable non-transitory recording medium storing a computer-executable program for causing a computer to:
 iteratively learn a parameter associated with identifying an image by using:
  a first loss function outputting a smaller value as a similarity between a belongingness probability of each class for the image and a given teacher belongingness probability of the image becomes greater, and
  a second loss function:
   when the image is an actual image, outputting a smaller value as an estimated authenticity probability becomes smaller and
   when the image an artificial image, outputting a smaller value as an estimated authenticity probability becomes greater, and
  wherein the iteratively learning further comprises reducing the value of the first loss function and the value of the second loss function.

8. The image recognition learning device according to claim 2, wherein the artificial image is generated using one or more random numbers, and wherein the iterative learning further comprises increasing a first value of the first loss function and a second value of the second loss function.

9. The image recognition learning device according to claim 2, wherein the interactively learning further comprises determining the belongingness probability of each class for the input image and outputting a class recognition result using the learnt parameter.

10. The image recognition learning device according to claim 3, wherein the interactively learning further comprises determining the belongingness probability of each class for the input image and outputting a class recognition result using the learnt parameter.

11. The image recognition learning method according to claim 5, wherein the teacher belongingness probability includes either one of a desired belongingness probability of each class or the belongingness probability of each class output for the image in a learning in progress stage of the iterative learning with different numbers of iterations.

12. The image recognition learning method according to claim 5, wherein the artificial image is generated using one or more random numbers, and wherein the iteratively learning further comprises increasing a first value of the first loss function and a second value of the second loss function.

13. The image recognition learning method according to claim 11, wherein the artificial image is generated using one or more random numbers, and wherein the iteratively learning further comprises increasing a first value of the first loss function and a second value of the second loss function.

14. The image recognition learning method according to claim 11, wherein the interactively learning further comprises:
 determining the belongingness probability of each class for the input image, and
 outputting a class recognition result using the learnt parameter.

15. The image recognition learning method according to claim 12, wherein the interactively learning further comprises:
 determining the belongingness probability of each class for the input image, and
 outputting a class recognition result using learnt parameter.

16. The computer-readable non-transitory recording medium of claim 7, wherein the teacher belongingness probability includes either one of a desired belongingness probability of each class or the belongingness probability of each class output for the image in a learning in progress stage of the iteratively learning with different numbers of iterations.

17. The computer-readable non-transitory recording medium of claim 7, wherein the artificial image is generated using one or more random numbers, and wherein the iteratively learning further comprises increasing a first value of the first loss function and a second value of the second loss function.

18. The computer-readable non-transitory recording medium of claim 16, wherein the artificial image is generated using one or more random numbers, and wherein the iteratively learning further comprises increasing a first value of the first loss function and a second value of the second loss function.

19. The computer-readable non-transitory recording medium of claim 7, the computer-executable program further causing the computer to:

determine the belongingness probability of each class for the input image; and output a class recognition result using the learnt parameter.

20. The computer-readable non-transitory recording medium of claim 16, the computer-executable program further causing the computer to:

determine the belongingness probability of each class for the input image; and output a class recognition result using the learnt parameter.

* * * * *